(12) United States Patent
Fukasawa

(10) Patent No.: US 6,788,329 B2
(45) Date of Patent: Sep. 7, 2004

(54) ROD LENS ARRAY AND PRINTER HEAD AND OPTICAL PRINTER USING THE SAME

(75) Inventor: Motomu Fukasawa, Iruma (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/201,001

(22) Filed: Jul. 24, 2002

(65) Prior Publication Data

US 2002/0180861 A1 Dec. 5, 2002

Related U.S. Application Data

(63) Continuation of application No. 09/589,059, filed on Jun. 8, 2000, now Pat. No. 6,473,111.

(30) Foreign Application Priority Data

Jun. 10, 1999 (JP) .................................... 11-163630
Jun. 5, 2000 (JP) ..................................... 2000-168198

(51) Int. Cl.[7] .............................. B41J 15/14; B41J 27/00
(52) U.S. Cl. ....................................................... 347/244
(58) Field of Search ................................ 347/244, 258, 347/238, 241, 242, 256, 257

(56) References Cited

U.S. PATENT DOCUMENTS

| 4,913,526 A | 4/1990 | Hediger ...................... 359/819 |
|---|---|---|
| 4,962,990 A | 10/1990 | Matsuzawa et al. ...... 324/244.1 |
| 5,557,394 A | 9/1996 | Haneda et al. ................. 399/41 |
| 5,638,479 A | 6/1997 | Takami et al. ............... 385/124 |
| 5,646,432 A | 7/1997 | Iwaki et al. ................. 257/347 |
| 5,808,718 A | 9/1998 | Aikoh et al. ................. 347/130 |
| 5,972,516 A | 10/1999 | Kaneko et al. ............. 428/429 |

FOREIGN PATENT DOCUMENTS

| EP | 0 908 953 A1 | 4/1999 |
|---|---|---|
| JP | 60-260445 | 12/1985 |
| JP | 63-91602 | 4/1988 |
| JP | 5-313201 | 11/1993 |
| JP | 6-43307 | 2/1994 |
| JP | 7-46382 | 2/1995 |
| JP | 8-21902 | 1/1996 |

*Primary Examiner*—Hai Pham
(74) *Attorney, Agent, or Firm*—Fitzpatrick, Cella, Harper & Scinto

(57) ABSTRACT

A rod lens array to be used for an optical printer, including: (a) a plurality of rod lenses arranged in an array; (b) a substance filled between the plurality of rod lenses; and (c) a pair of substrates sandwiching the plurality of rod lenses and the substance, wherein each of the substrates comprises a panel member and a layer formed on the surface of the panel member bearing the rod lenses thereon, and wherein the panel member is made of a fiber-reinforced plastic material and the layer is made of a resin, and the layer eliminates undulations formed by the fibers in the panel member.

4 Claims, 5 Drawing Sheets

ROD LENS ARRAY AND PRINTER HEAD AND OPTICAL PRINTER USING THE SAME

This application is a continuation of application Ser. No. 09/589,059 filed Jun. 8, 2000 now U.S. Pat. No. 6,473,111 issued Oct. 29, 2002.

BACKGROUND OF THE INVENTION

1. Field of the Invention

This invention relates to a rod lens array and also to a printer head and an optical printer using such a rod lens array. A rod lens array according to the invention is adapted to cause a plurality of light emitting elements to emit light and form highly accurate and sharp images of the elements on the surface of a photosensitive member that operates as recording medium. A rod lens array according to the invention can suitably be used in a printer head or an optical printer comprising LCDs (liquid crystal display elements) or LEDs (light emitting diodes) to name a few.

2. Related Background Art

Known graded refractive index rod lens arrays (hereinafter referred to simply as "rod lens array") used in optical printers such as liquid crystal printers and LED printers typically have a configuration as shown in FIG. 1 of the accompanying drawings, which is a schematic cross sectional view of a known rod lens array taken along a direction perpendicular to the optical axes of the rod lenses. Referring to FIG. 1, a plurality of rod lenses 31 are densely arranged and aligned relative to each other by means of a pair of side panels 32 to form a rod lens array 30. Subsequently, the gaps separating the rod lenses 31 are filled with opaque resin 33 to securely hold the rod lenses in position. In this way, the rod lens array 30 is prepared as an oblong image forming device for forming an erecting life-size image.

Normally, the side panels 32 are made of fiber-reinforced plastic or FRP. Therefore, the surfaces of the lateral walls 32 generally show undulations of a dimension of 6 to 8 $\mu$m reflecting the fibers contained therein.

FIG. 2 is a schematic cross sectional view of a principal portion of an optical printer realized by using such a rod lens array, illustrating the image forming effect of the rod lens array in an ideal state. In FIG. 2, the components same as or similar to those in FIG. 1 are denoted respectively by the same reference symbols and would not be described any further.

Referring to FIG. 2, light emitting means (an array of light emitting elements) 45 comprises a plurality of light emitting elements that are adapted to emit respective light beams according to the image signal applied thereto. Then, the light beams are focussed to an imaging spot 44 on the surface of a photosensitive drum 46 operating as recording medium to form an erecting life-size image by means of a rod lens array (imaging device) 30 comprising a plurality of rod lenses 31 arranged in array. Thus, the light emitting means 45 and the photosensitive drum 46 are arranged vis-a-vis with the rod lens array interposed therebetween. With this arrangement, a latent image of an object can be formed on the surface of the photosensitive drum of the optical printer. Note that the optical printer head of the optical printer includes the light emitting element array 45 and the rod lens array 30.

Known optical printer heads and optical printers comprising such a light emitting element array mostly provide a resolution of about 300 dpi. However, in response to the increased demand for high definition printer in recent years, optical printer heads and optical printers providing a high resolution of 600 dpi or 1,200 dpi are currently being marketed. Rod lens arrays used in such optical printer heads and optical printers are therefore required to meet rigorous imaging requirements that have not been experienced.

In other words, the image (of the light emitting elements) formed at the specified spot on the surface of the photosensitive drum is required to be dimensionally reduced in the case of a high definition optical printer so that each of the rod lenses has to focus the light beam passing therethrough precisely at the specified spot.

If the rod lenses are allowed to produce an ideal image in a condition where they are completely free from perversive factors, it is possible for the plurality of rod lenses 31 to form an image of a single spot on the surface of the photosensitive drum 46 as shown in FIG. 2 if the rod lenses 31 are arranged with little positional variances as shown in FIG. 1.

However, if a perversive factor is involved in any of the rod lenses of the array as shown in FIG. 3, the light beam emitted from the rod lens 51 involving a perversive factor is not focussed at the right spot to give rise to a phenomenon referred to as stray dot. Thus, FIG. 3 is a schematic cross sectional view of a principal portion of an optical printer realized by using a rod lens array, illustrating the image forming effect of the rod lens array when some of the rod lenses 51 involve a perversive factor. In FIG. 3, reference symbol 50 denotes a rod lens array and reference symbol 52 denotes a side panel, while reference symbols 55 and 54 denote a light emitting element array and a spot formed by a focussed light beam respectively.

Since known dot lenses have a large diameter and a sufficient strength while they are not required to show a high resolution, the stray dots formed by them, if ever, do not significantly affect the overall effect of the dot lens array.

However, in the case of an optical printer head or an optical printer required to show a resolution of 600 dpi or more, any cyclical changes in the formation of dots can result in an uneven density distribution of the obtained image that normally involves half tones to give rise to a serious problem.

One of the causes of the perversive factors of the rod lenses of a rod lens array is the undulations of a dimension of 6 to 8 $\mu$m due to fibers contained in the fiber-reinforced plastic (FRP) of the side panels. An uneven density distribution is produced in the obtained image when the spot formed by a rod lens is displaced from the right position by more than 1/5 of the size of a pixel required for the specified resolution of the printer.

SUMMARY OF THE INVENTION

In view of the above circumstances, it is therefore the object of the present invention to provide a rod lens array that can suppress any perversive factors of each of the rod lenses to eliminate the possible displacement of the spot formed by the rod lens and a printer head and an optical printer comprising such a rod lens array.

According to the invention, the above object is achieved by providing a rod lens array to be used for an optical printer, the rod lens array comprising:

a plurality of rod lenses arranged densely in array;

an opaque substance filled in the gaps separating the plurality of rod lenses; and a pair of side panels sandwiching the plurality of rod lenses and the opaque substance;

the rod lens array satisfying the requirement as defined by formula below;

$$S<(Z/L)\cdot(25.4/5P),$$

P being the resolution of the optical printer expressed in dpi, Z being the length of the rod lenses expressed in mm, L being the conjugate length of the rod lenses expressed in mm, S being the flatness of the surfaces of the side panels bearing the rod lenses.

In another aspect of the invention, there is provided a printer head to be used for an optical printer, the printer head comprising:

- a light emitting element array formed by arranging a plurality of light emitting elements;
- a plurality of rod lenses arranged densely in array to focus the light beams emitted respectively from the light emitting elements of the light emitting element array to a position separated by a predetermined distance;
- an opaque substance filled in the gaps separating the plurality of rod lenses; and
- a pair of side panels sandwiching the plurality of rod lenses and the opaque substance;
- the rod lens array satisfying the requirement as defined by formula below;

$$S<(Z/L)\cdot(25.4/5P),$$

P being the resolution of the optical printer expressed in dpi, Z being the length of the rod lenses expressed in mm, L being the conjugate length of the rod lenses expressed in mm, S being the flatness of the surfaces of the side panels bearing the rod lenses.

In still another aspect of the invention, there is provided an optical printer comprising:

- a light emitting element array formed by arranging a plurality of light emitting elements;
- a photosensitive member arranged at a position separated from the light emitting element array by a predetermined distance;
- a plurality of rod lenses arranged densely in array to focus the light beams emitted respectively from the light emitting elements of the light emitting element array on the photosensitive member;
- an opaque substance filled in the gaps separating the plurality of rod lenses; and
- a pair of side panels sandwiching the plurality of rod lenses and the opaque substance;
- a developing unit for developing an electrostatic latent image formed on the photosensitive member by irradiating the photosensitive member with the light beams emitted from the light emitting elements to a toner image;
- a transfer unit for transferring the developed toner image onto an image receiving member;
- a fixing unit for fixing the transferred toner image on the image receiving member;
- the rod lens array satisfying the requirement as defined by formula below;

$$S<(Z/L)\cdot(25.4/5P),$$

P being the resolution of the optical printer expressed in dpi, Z being the length of the rod lenses expressed in mm, L being the conjugate length of the rod lenses expressed in mm, S being the flatness of the surfaces of the side panels bearing the rod lenses.

DESCRIPTION OF THE PREFERRED EMBODIMENTS

Figure 1:
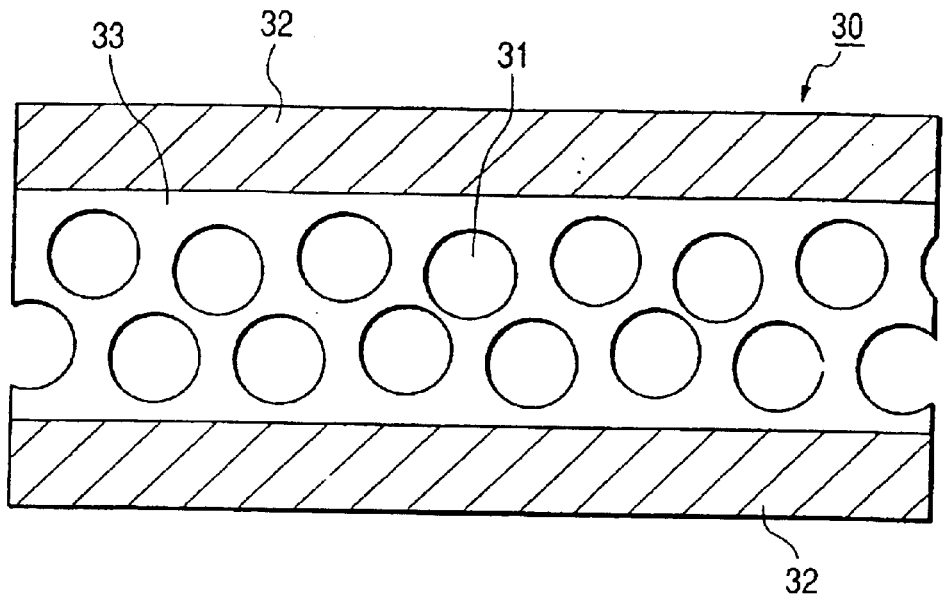
FIG. 1 is a schematic cross sectional view of a known rod lens array.
Figure 2:
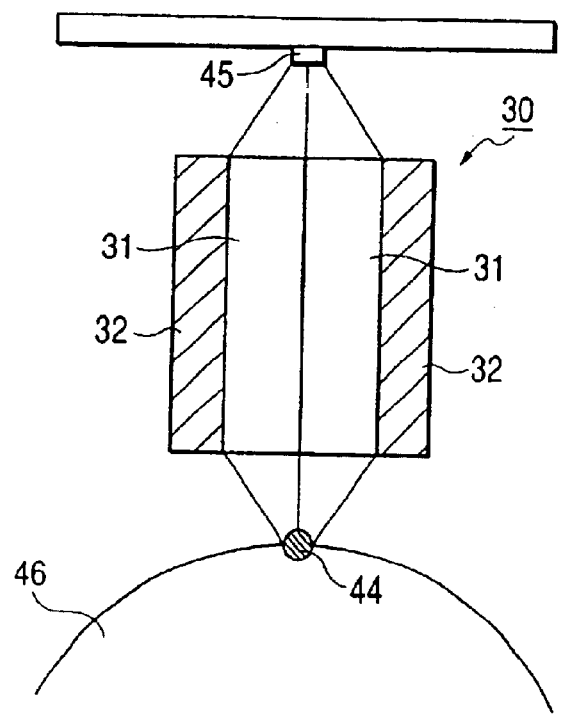
FIG. 2 is a schematic cross sectional view of a principal portion of an optical printer realized by using such a rod lens array, illustrating the image forming effect of the rod lens array in an ideal state.
Figure 3:
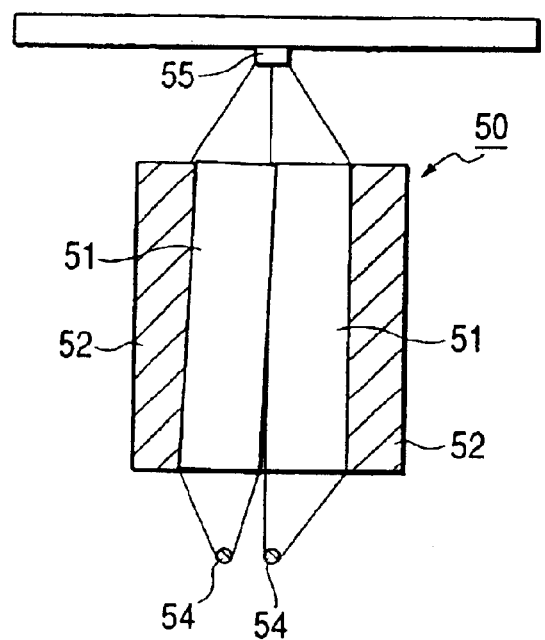
FIG. 3 is a schematic cross sectional view of a principal portion of an optical printer realized by using a rod lens array, illustrating the image forming effect of the rod lens array when some of the rod lenses involve a perversive factor.
Figure 4:
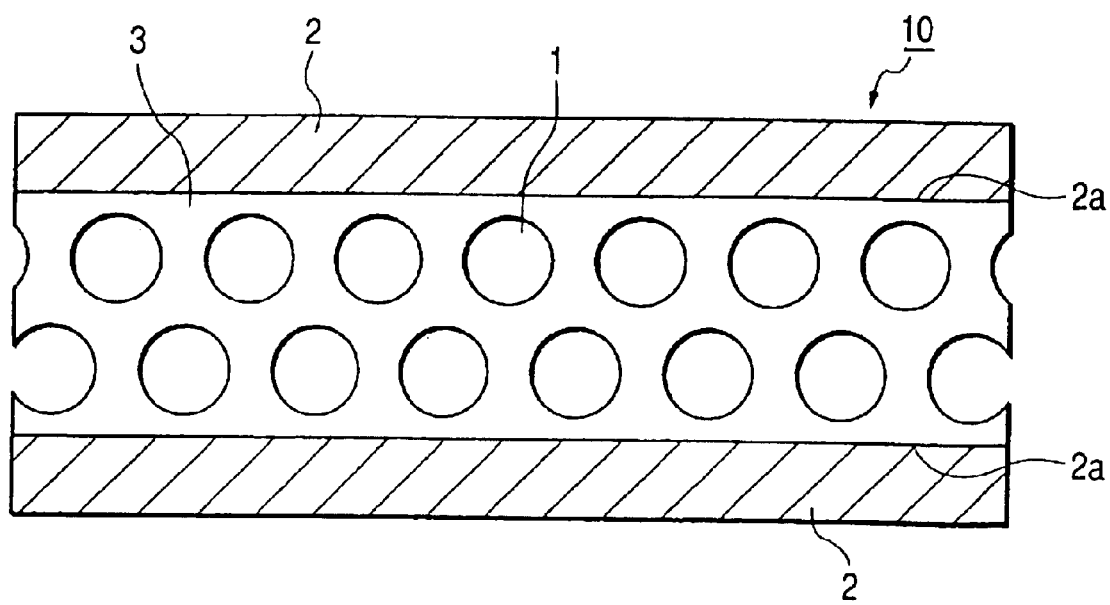
FIG. 4 is a schematic cross sectional view of Embodiment 1 of rod lens array according to the invention.

FIG. 4 is a schematic cross sectional view of Embodiment 1 of rod lens array according to the invention taken along a direction perpendicular to the rod lens array.

Referring to FIG. 4, the rod lens array operating as imaging device is generally denoted by reference symbol 10. The rod lens array 10 is adapted to be used in an optical printer to form an erecting life-size image of each of the light emitting elements of the light emitting element array of the optical printer on the image plane of the photosensitive member of the optical printer. As shown in FIG. 4, a plurality of rod lenses 1 are densely arranged in array. The rod lenses 1 are substantially held in position as they are sandwiched by a pair of side panels 2 running in the direction of the array (main-scanning direction). Then, the rod lenses 1 come to be rigidly held in position as the gaps separating the rod lenses are filled with opaque resin 3.

The side panels 2 of this embodiment are made of fiber-reinforced plastic (FRP). The surfaces 2a of the side panels 2 facing the rod lenses 1 are smoothed in order to suppress any displacement of the light spots formed by the rod lenses as a result of the focussing effect of the latter.

Figure 5:
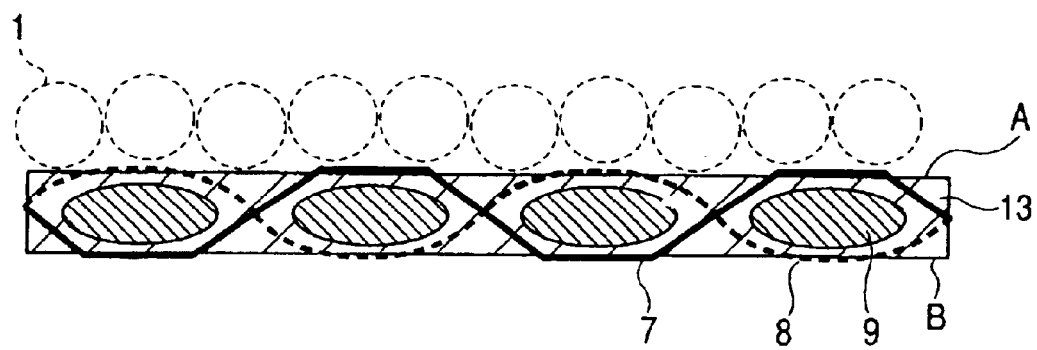
FIG. 5 is an enlarged schematic cross sectional view of a principal portion of the fiber-reinforced plastic of the side panels of a known rod lens array.

Now, the structure of the side panels 2 of this embodiment will be discussed in detail. FIG. 5 is an enlarged schematic cross sectional view of a principal portion of the fiber-reinforced plastic of the side panels of a known rod lens array. Generally, fiber-reinforced plastic is supplied in the form of a sheet containing warps 9 and woofs 7 and 8 that are woven in an intertwined manner, the warps 9 extending in a direction perpendicular to FIG. 5. The voids in the sheet are filled with a binder 13.

It will be appreciated from FIG. 5 that the known fiber-reinforced plastic sheet has undulations on the both surfaces A and B. When rod lenses 1 are arranged on surface A of the fiber-reinforced plastic sheet, the array of the rod lenses 1 is disturbed by the undulations to give rise to a perversive factor. As pointed out earlier, such a perversive factor displaces the dots formed by the rod lenses on the photosensitive drum operating as recording medium from the right position to consequently give rise to an uneven density distribution in the image by the optical printer.

Figure 6:
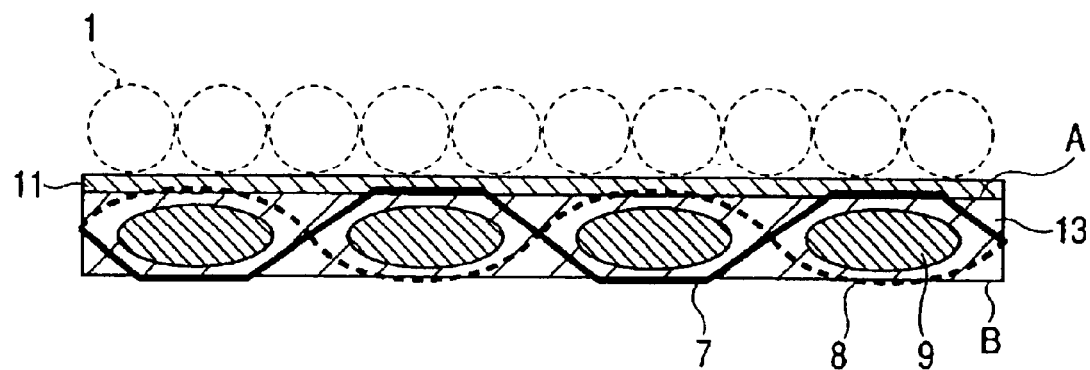
FIG. 6 is an enlarged schematic cross sectional view of a principal portion of the fiber-reinforced plastic of the side panels of the rod lens array of FIG. 4.

FIG. 6 is an enlarged schematic cross sectional view of a principal portion of the fiber-reinforced plastic of the side panels of Embodiment 1 shown in FIG. 4. In FIG. 6, the components same as those in FIG. 5 are denoted respectively by the same reference symbols and would not be described any further. In this embodiment, the surface A of each of the side panels for bearing the rod lenses 1 is coated (filled) with an opaque resin layer 11 to make the rod lenses 1 to be carried on a very smooth plane. The surface of the resin layer can be made to show a satisfactory level of flatness by smoothing the surface of the mold for forming the resin layer. Alternatively, the surface of the resin layer may be polished to achieve a satisfactory level of flatness after coating the side panel with resin.

Now, the requirements that a rod lens array according to the invention has to satisfy will be described below.

Figure 7:
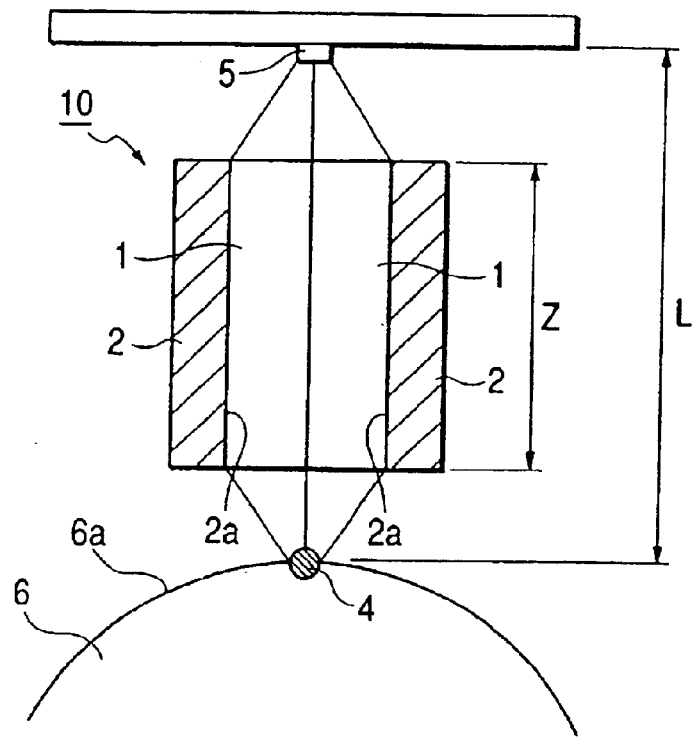
FIG. 7 is a schematic cross sectional view of a principal portion of an optical printer realized by using the rod lens array of FIG. 4, illustrating the image forming effect of the rod lens array.

FIG. 7 is a schematic cross sectional view of a principal portion of an optical printer realized by using the embodiment of rod lens array of FIG. 4, illustrating the image forming effect of the rod lens array. In FIG. 7, the components that are same as those of FIG. 4 are denoted respectively by the same reference symbols and will not be described any further.

Referring to FIG. 7, light emitting means (light emitting element array) 5 comprises a plurality of light emitting elements and light beams are emitted from the respective light emitting elements according to the image signal applied thereto. The light beams are then focussed by the rod lens array (imaging device) 10 comprising a plurality of rod lenses to form an erecting life-size image 4 on the surface of the photosensitive drum 6 that is operating as recording medium and arranged vis-a-vis the light emitting element array 5 with the rod lens array 10 interposed therebetween. The light emitting element array 5 and the surface of the photosensitive drum 6 have an optically conjugate relationship. The distance between them is expressed by L(mm), while the proper length of the rod lenses themselves is expressed by Z(mm). Note that the light emitting element array 5 and the rod lens array 10 form an optical printer head.

By focussing the light beams emitted from the light emitting element array 5 on the surface of the photosensitive drum 6, a latent image can be formed on the surface of the photosensitive drum. If the resolution of the optical printer is P(dpi) and the flatness of the surfaces 2a bearing the rod lenses of the side panels 2 is S, the maximum displacement Δ of the focal points of the rod lenses 1 caused by the undulations of the surfaces 2a is approximately expressed by formula (1) below:

$$\Delta = (S/Z) \cdot L \quad (1),$$

where L(mm) is the conjugate length of the rod lenses 1 and Z(mm) is the proper length of the rod lens themselves as pointed out above.

An acceptable focussing effect can be guaranteed when the maximum displacement Δ of the focal points of the rod lenses 1 is held less than ⅕ of the size of a pixel of the optical printer. When the resolution of the optical printer is P(dpi), the size of each pixel of the optical printer is expressed by 25.4/P(mm). Thus, the flatness (smoothed flatness) S in formula (1) has to satisfy the requirement of formula (2) below.

$$S < (Z/L) \cdot (25.4/5P) \quad (2)$$

Shortly, a rod lens array according to the invention satisfies the requirement of formula (2) above. If the rod lens array does not meet the requirement of formula (2), it comes to involve perversive factors to make it no longer possible for the optical printer to provide a satisfactory level of image quality.

Now, examples of sets of numerical values that can be used to meet the requirement of formula (2) will be shown below.

[Set of Numerical Values: Example 1]

The flatness S required to the surfaces of the side panels used for an optical printer with a resolution of 600 dpi should meet the requirement below when a rod lens array having a conjugate length L of the rod lenses equal to 10 mm and a proper length Z of the rod lenses equal to 4.3 mm is used in it.

$$S < 3.6 \, \mu m$$

[Set of Numerical Values: Example 2]

The flatness S required to the surfaces of the side panels used for an optical printer with a resolution of 600 dpi should meet the requirement below when a rod lens array having a conjugate length L of the rod lenses equal to 15 mm and a proper length Z of the rod lenses equal to 6.9 mm is used in it.

$$S < 3.9 \, \mu m$$

[Set of Numerical Values: Example 3]

The flatness S required to the surfaces of the side panels used for an optical printer with a resolution of 1200 dpi should meet the requirement below when a rod lens array having a conjugate length L of the rod lenses equal to 17 mm and a proper length Z of the rod lenses equal to 9 mm is used in it.

$$S < 2.2 \, \mu m$$

Thus, in this embodiment, the surfaces 2a of the side panels 2 bearing the rod lenses are coated with a resin layer to meet the requirement of formula (2) and suppress the uneven MTF due to the perversive factors of the rod lenses 1. Additionally, an optical printer comprising the above embodiment of rod lens array is free from any uneven density distribution of the obtained image that normally involves half tones and hence it can operate as a high definition optical printer.

Figure 8:
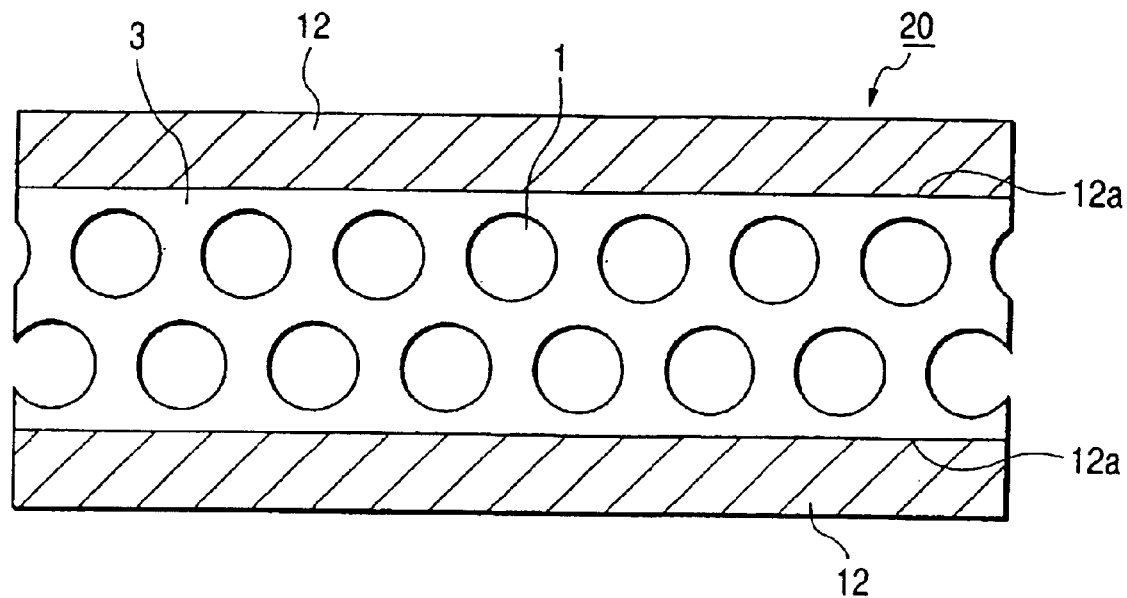
FIG. 8 is a schematic cross sectional view of Embodiment 2 of rod lens array according to the invention.

FIG. 8 is a schematic cross sectional view of Embodiment 2 of rod lens array according to the invention, taken along a direction perpendicular to the rod lens array. In FIG. 8, the components same as those of FIG. 4 are denoted respectively by the same reference symbols and will not be described any further.

This embodiment of rod lens array 20 differs from that of Embodiment 1 only in terms of the structure of the side panels 12. Otherwise, this embodiment is identical with Embodiment 1. In this embodiment again, the side panels 12 are made of fiber-reinforced plastic (FRP), although the surfaces 12a of the side panels 12 that bear the rod lenses 1 of this embodiment are smoothed by polishing, while the corresponding surfaces 2a of the side panels 2 of Embodiment 1 are coated with a resin layer. In other words, the flatness of the surfaces 12a of the lateral walls 12 that bear the rod lenses 1 of this embodiment is made to satisfy the requirement of formula (2) by polishing the surfaces. This embodiment of rod lens array provides an image forming effect exactly same as Embodiment 1.

Figure 9:
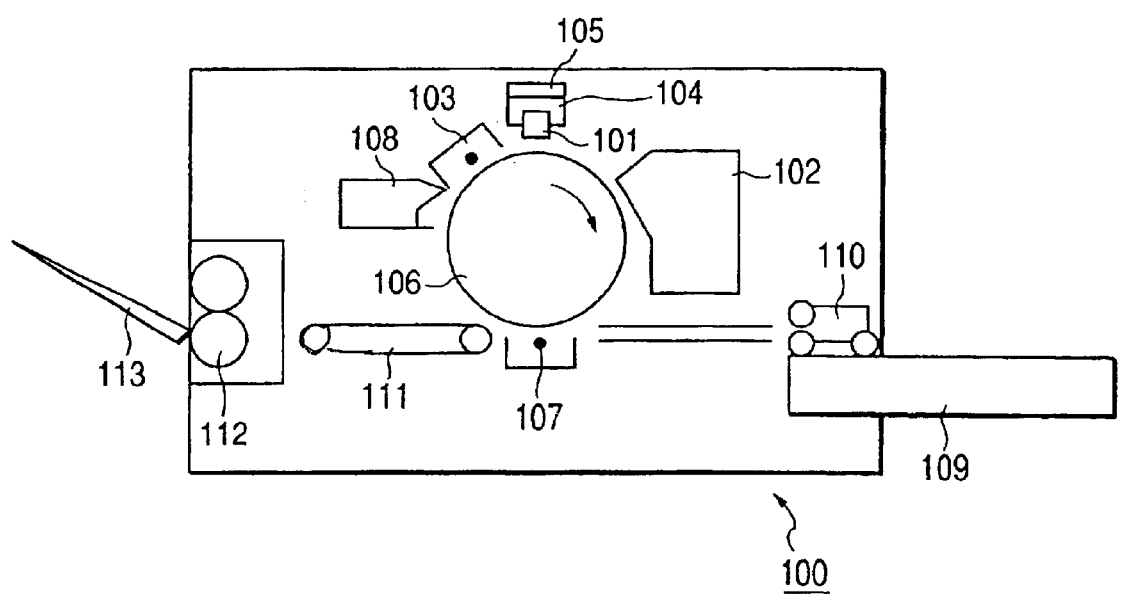
FIG. 9 is a schematic cross sectional view of an optical printer realized by using a rod lens array according to the invention.

FIG. 9 is a schematic cross sectional view of an optical printer realized by using a rod lens array according to the invention. Note that the optical printer comprises light emitting diodes (LEDs).

Referring to FIG. 9, the printer main body 100 of the optical printer contains a photosensitive drum 106 adapted to be driven to rotate clockwise in FIG. 9. A light emitting diode (LED) printer head 104 is arranged above the photosensitive drum 106 in order to expose the latter to light beams. The LED printer head 104 comprises a light emitting diode (LED) array 105 formed by arranging in array a plurality of light emitting diodes that are adapted to emit light according to the image signal applied thereto and a rod lens array 101 formed by arranging so many rod lenses that are adapted to form a pattern of light beams emitted from the respective light emitting diodes on the photosensitive drum 106. The rod lens array 101 has a configuration same as that of Embodiment 1 or Embodiment 2 described above. The focal plane of the rod lens array 101 for the light beams emitted from the light emitting diodes is located on the surface of the photosensitive drum 106. In other words, the light emitting plane of the light emitting diodes and the photosensitive plane of the photosensitive drum are made to have an optical conjugate relationship by the rod lens array.

The photosensitive drum 106 is surrounded by an electric charger 103 for uniformly charging the surface of the photosensitive drum 106 with electricity and a developing unit 102 for causing toner to adhere to the surface of the photosensitive drum 106 to reflect the exposure pattern formed by the printer head 104 along with a transfer charger 107 for transferring the toner image formed on the photosensitive drum 106 onto a toner image receiving member (not shown) that may be a sheet of copying paper and a cleaning means 108 for collecting the residual toner remaining on the photosensitive drum 106 after the transfer of the toner image.

Additionally, the printer main body 100 is also provided with a paper cassette 109 for storing toner image receiving members (sheets of copying paper), a paper feeding means 110 for feeding a toner image receiving member between the photosensitive drum 106 and the transfer charger 107 from the paper cassette 109, a fixing unit 112 for fixing the toner image transferred onto the toner image receiving member, a conveying means 111 for conveying the toner image receiving member to the fixing unit 112 and a paper delivery tray 113 for holding the toner image receiving member discharged from the fixing unit 112 in order to delivering it further to the outside.

Now, the image forming sequence of the LED printer will be described below.

Firstly, the photosensitive drum 106 is uniformly charged with electricity in advance by the electric charger 103. Meanwhile, the light emitting diodes of the LED array 105 in the printer head 104 are selectively made to emit light according to the image signal input to it from an image signal modulating means (not shown). The light beams emitted from the LED array 105 are focussed on the surface of the photosensitive drum 106 by the rod lens array 101 to expose the photosensitive drum 106 with light and form a pattern of light reflecting the input image signal. As a result of the exposure, an electrostatic latent image is formed on the photosensitive drum 106 to by turn reflect the exposure pattern.

Then, toner, or a developing agent, is made to adhere to the electrostatic latent image on the photosensitive drum 106 by the developing unit 102 to make the exposure pattern visible. At the same time, a toner image receiving member is fed from the paper cassette 109 to a position near the photosensitive drum 106 by the paper feeding means 110 in synchronism with the rotary motion of the photosensitive drum 106. As the toner image receiving member passes between the photosensitive drum 106 and the transfer charger 107, the toner image on the photosensitive drum 106 is transferred onto the toner image receiving member by the transfer charger 107.

The toner image receiving member that is now carrying the toner image is then conveyed to the fixing unit 112 by the conveying means 11, where the toner image is fixed to the toner image receiving member. The toner image receiving member now carrying the fixed toner image is then discharged onto the delivery tray 113. After the transfer of the toner image onto the toner image receiving member, the residual toner remaining on the surface of the photosensitive drum 106 is removed by the cleaning means 108. The LED printer carries out an image forming operation by following the above sequence for each image it produces.

Note that the present invention is by no means limited to the above described embodiments, which may be modified in various different ways. For instance, while the surfaces of the side panels of fiber-reinforced plastic were polished or coated with a resin layer in the above embodiments, some other technique may alternatively be used to satisfy the requirement of formula (2) above. Such variations and modifications are found within the scope of the present invention as defined by the appended claims for patent.

What is claimed is:

1. A rod lens array to be used for an optical printer having a resolution, said rod lens array comprising:

a plurality of rod lenses arranged in an array having gaps separating said rod lenses;

a substance filled in the gaps, and a pair of side panels sandwiching said plurality of rod lenses and said substance, wherein said plurality of rod lenses have a conjugate length, and wherein each of said side panels comprises a panel member made of a fiber-reinforced material and has a surface with a flatness S of less than 3.9 $\mu$m.

2. A printer head comprising a rod lens array according to claim 1 and a light emitting element array formed by arranging a plurality of light emitting elements.

3. An optical printer comprising a printer head according to claim 2 and a photosensitive member arranged at a position separated from said light emitting element array by a predetermined distance.

4. A rod lens array according to claim 1, wherein the flatness S is less than 2.2 $\mu$m.

* * * * *